(12) United States Patent
Nicholls et al.

(10) Patent No.: US 9,830,828 B2
(45) Date of Patent: Nov. 28, 2017

(54) SYSTEMS AND METHOD FOR AIS TRANSPONDER INTEGRATION WITH ILS/VOR RECEIVERS

(71) Applicant: Honeywell International Inc., Morristown, NJ (US)

(72) Inventors: James Alexander Nicholls, Glendale, AZ (US); Mark Karl Sutter, Phoenix, AZ (US); Robert S. Doyle, Peoria, AZ (US); Matt Glassburn, Phoenix, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/667,486

(22) Filed: Mar. 24, 2015

(65) Prior Publication Data
US 2016/0284222 A1 Sep. 29, 2016

(51) Int. Cl.
*G08G 5/00* (2006.01)
*G01S 19/38* (2010.01)
(Continued)

(52) U.S. Cl.
CPC ........... *G08G 5/0047* (2013.01); *G01S 1/045* (2013.01); *G01S 1/10* (2013.01); *G01S 5/0226* (2013.01);
(Continued)

(58) Field of Classification Search
None
See application file for complete search history.

(56) References Cited

U.S. PATENT DOCUMENTS 4,363,933 A 12/1982 Mercer
6,114,975 A 9/2000 Guillard
(Continued)

FOREIGN PATENT DOCUMENTS

CA 2773702 7/2014
EP 2669699 12/2013
(Continued)

OTHER PUBLICATIONS

Civil Aviation Authority, "CAA Paper 2010/01 The SBAS Offshore Approach Procedure (SOAP)", May 2010, pp. 1-96, Published in: GB.

(Continued)

*Primary Examiner* — Mussa A Shaawat
*Assistant Examiner* — Kyung Kim
(74) *Attorney, Agent, or Firm* — Fogg & Powers LLC

(57) ABSTRACT

A receiver includes an RF module to receive and down convert multiple types of RF signals received from at least one antenna; a communication unit configured to communicate signals with at least one external device; and a processing unit communicatively coupling the radio frequency module with the communication unit. Processing unit receives operation mode selection. When first operation mode is selected, processing unit receives first input signal from antenna via RF module (the first input signal including ILS signal and/or VOR signal) and outputs first output signal based on first input signal to external device. When second operational mode is selected, processing unit receives second input signal from antenna via radio frequency unit (second input signal including AIS signal including data regarding a current location of remotely located transmitting device) and outputs second output signal based on second input signal to external device.

22 Claims, 8 Drawing Sheets

(51) Int. Cl.
  *G01S 5/02* (2010.01)
  *G01S 19/15* (2010.01)
  *G01S 13/91* (2006.01)
  *G01S 1/04* (2006.01)
  *G01S 1/10* (2006.01)
  *G01S 1/50* (2006.01)

(52) U.S. Cl.
  CPC ............ *G01S 5/0294* (2013.01); *G01S 13/91* (2013.01); *G01S 19/15* (2013.01); *G01S 19/38* (2013.01); *G01S 1/50* (2013.01)

(56) References Cited

U.S. PATENT DOCUMENTS

| | | |
|---|---|---|
| 7,474,962 B2 | 1/2009 | Waid et al. |
| 8,234,021 B2 | 7/2012 | Colclough |
| 8,442,706 B2 | 5/2013 | Doeppner et al. |
| 2010/0228408 A1 | 9/2010 | Ford et al. |
| 2010/0292871 A1* | 11/2010 | Schultz .................. G01C 21/00 701/3 |

FOREIGN PATENT DOCUMENTS

| | | |
|---|---|---|
| EP | 2695815 | 2/2014 |
| KR | 20140061805 | 5/2014 |

OTHER PUBLICATIONS

Doucy et al, "Development and Tests of an Automatic Decking System Demonstrator of VTOL UAV on Naval Platform", "Platform Innovations and System Integration for Unmanned Air, Land and Sea Vehicles (AVT-SCI Joint Symposium)", May 2007, pp. 14-1 to 14-10, Published in: FR.

Ford et al., "Helicopter Ship Board Landing System", "Proceedings of the 18th International Technical Meeting of the Satellite Division of the Institute of Navigation (ION GNSS 2005)", Sep. 2005, pp. 1-10.

Heo et al., "Robust Airborne Navigation Algorithms for SRGPS", "Position Location and Navigation Symposium, 2004. PLANS 2004", Apr. 26-29, 2004, pp. 175-183.

"Technical characteristics for an automatic identification system using time division multiple access in the VHF maritime mobile frequency band", Feb. 2014, pp. i-146, Publisher: International Telecommunication Union.

U.S. Department of Transportation Federal Aviation Administration, "Approval of Offshore Standard Approach Procedures, Airborne Radar Approaches, and Helicopter En Route Descent Areas", Advisory Circular No: 90-80B, Apr. 12, 1999, pp. 1-58.

European Patent Office, "Extended European Search Report from EP Application No. 16159282.9 dated Jul. 21, 2016", "from Foreign Counterpart of U.S. Appl. No. 14/667,486", Jul. 21, 2016, pp. 1-5, Published in: EP.

* cited by examiner

SYSTEMS AND METHOD FOR AIS TRANSPONDER INTEGRATION WITH ILS/VOR RECEIVERS

BACKGROUND

Helicopters on approach to oil rigs and ships in low visibility conditions need to obtain guidance for the path to their destination and to be able to assure clearance from other rigs and vessels. Ships and even oil rigs can move around and maintaining a database of dynamic locations may not be practical. Thus, the destination is often not a fixed location. Weather radar has been used in a ground mapping mode to allow the pilot to spot objects on the water. This method does not facilitate identification of the objects or allow the flight control system to provide guidance and/or navigation to those objects. In addition, certification authorities have expressed concerns about using weather radar to perform a task for which it was not intended and may not have the required integrity.

SUMMARY

A receiver includes a radio frequency module configured to receive and down convert multiple types of radio frequency signals received from at least one antenna; a communication unit configured to communicate signals with at least one external device; and a processing unit communicatively coupling the radio frequency module with the communication unit. The processing unit is configured to receive an operation mode selection. When a first operation mode is selected: the processing unit is configured to receive at least a first input signal from the at least one antenna via the radio frequency module, the at least the first input signal including at least one of an instrument landing system (ILS) signal and a VHF omni ranging (VOR) signal; and the processing unit is configured to output a first output signal based on the first input signal to the external device. When a second operational mode is selected: the processing unit is configured to receive at least a second input signal from the at least one antenna via the radio frequency module, the at least the second input signal including an automatic identification system (AIS) signal including data regarding a current location of at least one remotely located transmitting device; and the processing unit is configured to output a second output signal based on the at least the second input signal to the external device.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
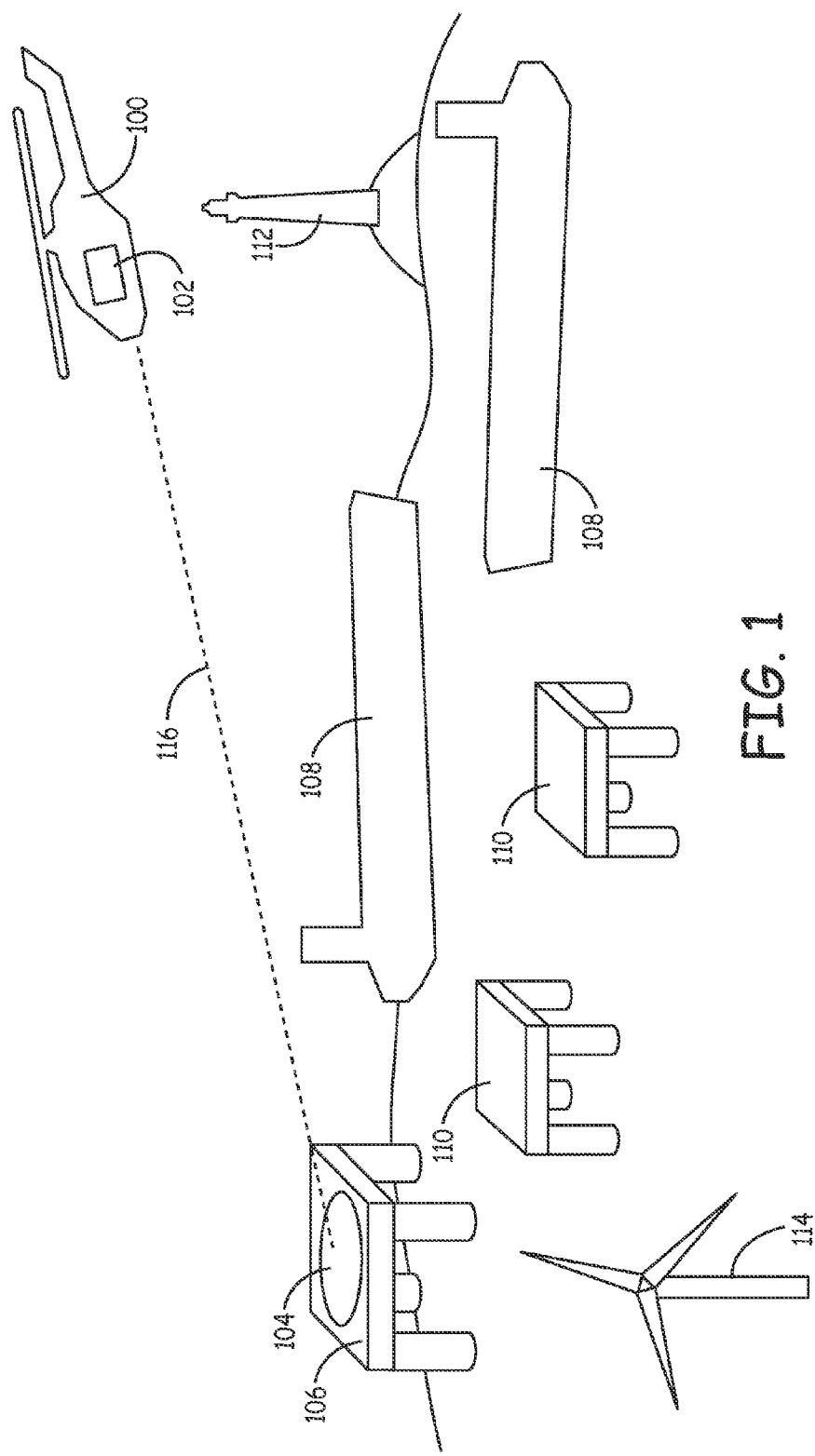
FIG. 1 is a general block diagram depicting an exemplary embodiment of an aircraft implementing an integrated radio navigation system receiver for receiving VOR and/or ILS signals while in a first operation mode and Automatic Identification System (AIS) signals while in a second operation mode.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the methods presented in the drawing figures and the specification are not to be construed as limiting the order in which the individual steps may be performed. The following detailed description is, therefore, not to be taken in a limiting sense.

Traditional landing systems for aircraft are generally associated with having known coordinates of where you want to land that can be placed into a database to create a flight plan to a particular latitude and longitude, such as Global Navigation Satellite System (GNSS) coordinates. In addition, localizer signals aid during landing as well. Some aircraft are equipped with VHF Omni Ranging (VOR) radio receivers for en-route navigation and with Instrument Landing System (ILS) and Global Navigation Satellite System (GNSS) Landing System (GLS) receivers for approach navigation used during aircraft landing. VOR and ILS receivers include localizer VHF and/or glideslope UHF radio receivers to receive guidance signals for the selected airport runway.

In example embodiments, the GNSS system is implemented using a Global Positioning System (GPS) Landing System (GLS), but it is understood that the system is not limited to GPS signals. In other implementations, other types of Global Navigation Satellite Systems (GNSS), such as GLONASS, Galileo, Beidou and Compass navigation systems, and combinations thereof, may in time be used instead of GPS to obtain the aircraft position relative to the desired landing/approach path to generate the guidance signals provided to the autopilot. Aircraft uses the GNSS ranging signals and the corrections to calculate its position and also to calculate how far it is from the waypoints and to steer the aircraft to line up with the waypoints.

In contrast to traditional landing systems, off-shore flights to oil rigs and ships often have a landing destination this is moving. In exemplary embodiments, these approaches are flown using weather radar to navigate. GNSS may be used to navigate to the general area of the moving destination and then a weather radar can be used in a ground scanning mode to spot the oil rig, ship, other vessel, or other moving landing pad. In exemplary embodiments, the weather radar is also used to identify other oil rigs, ships, vessels, and/or other traffic or obstacles in the area to avoid having dangerous obstacles in the approach path to the destination.

Disadvantages with use of the weather radar in this way include it not being easy to identify which return on the weather radar is from the destination oil rig, ship, vessel, and/or other moving landing pad you are attempting to fly to. This is particularly true when there are multiple oil rigs, ships, vessels, and/or other obstacles in close proximity to one other that show up as returns on the weather radar. In exemplary implementations, a parallel offset procedure is conducted with an approach path into wind. An aircraft will fly an approach course offset to one side of the destination oil rig. If the destination oil rig is spotted visually prior to the missed approach point, the pilot can turn and land on the oil rig. If the oil rig is not acquired visually, a missed approach can be performed with a straight ahead climb to a safe altitude. While the approximate coordinates of the oil rig may be known, some rigs are mobile or floating and the destination coordinates can change, making it difficult to maintain the position in a navigation database. The movement of the oil rig can also result in the requirement for a large parallel offset which can reduce the probability of acquiring the oil rig visually in poor visibility conditions. For approaches to ships which are moving, the use of database coordinates is not viable at all.

An additional problem is the ability to identify the specific oil rig or ship on which the helicopter is to land. This can be problematic as many oil rigs are visually similar. There are significant numbers of incidents where helicopters have landed on the wrong oil rig, while the operators believed they were landing on the correct one. This is a potential safety concern if the oil rig has not been prepared to receive the helicopter because of hazards such as a crane which is moving or exhausts from the oil rig operations that could impact helicopter engine power. Further, there might be loose articles, other equipment, or personnel on the landing area or in a hazardous location during the helicopter landing.

Exemplary embodiments described herein describe systems and methods for overcoming the disadvantages of using the weather radar in ground scanning mode for guidance to their destination. Ships above a threshold weight are required by the International Maritime Organization to carry an Automatic Identification System (AIS) transponder that transmits data such as the ship's identity, GNSS position, and speed to allow collision avoidance between multiple ships. Installation of a receiver for AIS transponder data on helicopters can be used to allow helicopters to identify the objects on the water and provide an independent means to validate observations made using the weather radar. By independently validating the weather radar data using an alternate means, the concerns regarding integrity can be mitigated. Currently, not all oil rigs are required to install AIS transponders. In exemplary embodiments, all rigs would carry and continually operate AIS transponders. While some helicopters (particularly maritime search and rescue helicopters) carry receivers for AIS transponder information, issues with integration and display of data and the cost and weight of these devices has precluded widespread adoption. Search and rescue aircraft, maritime patrol aircraft, fisheries patrol aircraft, drug interdiction aircraft, police and coast guard aircraft, and other rotary and/or fixed wing aircraft may also have needs to track and identify vessels, oil rigs and other objects of interest carrying a device capable of receiving AIS signals.

FIG. 1 is a general block diagram depicting an exemplary embodiment of an aircraft 100 (such as a helicopter, quadcopter, airplane, jet, rocket, drone, or other aircraft) including a single integrated radio navigation receiver 102 capable of receiving: (1) instrument landing system (ILS) signals and/or VHF omni-ranging (VOR) signals; and (2) Automatic Identification System (AIS) signals. In exemplary embodiments, the integrated radio navigation receiver 102 is part of transceiver and/or transponder. In exemplary embodiments, either a separate transmitter or transmitter function of a transceiver and/or transponder can be used to transmit AIS signals as well. In exemplary embodiments AIS transponder signals will be received from each ship, oil rig, etc. in the area, including an identification (unique ID), a location (which may include GNSS coordinates), and/or a velocity (which may include direction and speed). While aircraft 100 is described and shown as a helicopter in FIG. 1, it is understood that in other embodiments, other types of aerial vehicles can include the features described, such as helicopters, quadcopters, airplanes, jets, rockets, drones, or other aircraft.

In exemplary embodiments, the integrated radio navigation receiver 102 is toggled between a first operation mode for use with ILS and/or VOR signals and a second operation mode for use receiving AIS data. Operational uses would typically not require the ability to simultaneously operate in both of these modes. In exemplary embodiments, while the aircraft is over the ground, the ILS and/or VOR signals can be received by the receiver to aid in guidance and/or navigation during landing of the aircraft. In contrast, while the aircraft is over the water (such as the ocean or another navigable body of water), ILS and/or VOR signal reception may not be as useful as there would not be ground stations broadcasting the ILS and/or VOR signals. In exemplary embodiments, as shown in FIG. 1, while the receiver is in the AIS receive mode, it can be used to navigate to a destination 104 (such as a landing pad) on destination vessel 106 (such as an oil rig or other ship). In exemplary embodiments, the AIS receive mode can be used to land the aircraft 100 at the destination 104. In other embodiment, the AIS receive mode is used to navigate to a spot above the destination 104 so that other functions can be performed. In exemplary embodiments, the aircraft 100 is a helicopter that navigates to the destination 104 without landing such that personnel and/or supplies can be winched down at the destination 104, such as to retrieve people from a ship without landing in a search and rescue scenario or to put personnel on a wind turbine to make repairs. In other exemplary embodiments, the aircraft is used to drop rescue equipment to a distressed vessel.

The received AIS signals can also be used for avoidance and/or clearance of other obstacles, such as other vessels including ships 108, oil rigs 110, light houses 112, and/or wind turbines 114. In exemplary embodiments, the received AIS signals from a plurality of AIS transmitter installations other than the destination 104 can also be used for other purposes, such as fisheries patrol, situational awareness, etc. In exemplary embodiments, the AIS signals received at the receiver include a unique identification (unique ID), position, and/or velocity information for a particular transmitter on a particular oil rig, ship, and/or other obstacle. In exemplary embodiments, the flight path 116 is based on the AIS signals to determine the location of the landing zone and optionally could include inputs from the pilot or FMS to define the approach course. In exemplary embodiments, the flight path 116 for approach may not be directly to the AIS transmitter. In exemplary embodiments, the flight path 116 is offset to one side or the other of the destination 104 in order to support a missed approach procedure. In these embodiments, the aircraft 100 will turn to land on the rig once the pilot has visually spotted the destination 104. In these embodiments, if the destination 104 does not become visible, the aircraft 100 can fly on by.

In exemplary embodiments, display of AIS data does not meet the need to provide guidance to the destination 104 on the destination vessel 106 (or other ship or vessel). In exemplary embodiments described herein, the integrated radio navigation receiver 102 is an ILS and/or VOR receiver that has been modified to also tune to AIS transponder frequencies and process the data received. In exemplary embodiments, a plurality of AIS transponders transmit on at least one AIS frequencies in a time division multiplexed way. Integration with a GPS receiver allows the integrated radio navigation receiver 102 to simulate/emulate the ILS deviation outputs and provide guidance to a vessel with a selected AIS transponder on the surface. By emulating the ILS outputs, the proposed receiver can be coupled into the flight controls of most existing aircraft to provide approach guidance. The integrated radio navigation receiver 102 could also provide a bearing output that could be used to display a bearing to a selected AIS transponder. This is similar to how a bearing pointer can be used when operating in the ILS and/or VOR mode. Accordingly, the output while in AIS mode could be made compatible with displays expecting an input formatted for operation in the traditional ILS and/or VOR mode.

In exemplary embodiments, the bearing pointer could be used to indicate traffic while the course pointer is being used to provide guidance to the landing zone. In these exemplary embodiments, the bearing pointer could be displayed "Parked" at the 90 degree bearing relative to the aircraft nose. In the event that AIS transponder other than the destination selected transponder is identified within some band around the aircraft path, the bearing point could be moved to point to that AIS transponder and alert the pilot to the location of a potential obstruction.

In exemplary embodiments, a GNSS receiver is either integrated into the integrated radio navigation receiver 102 or is a standalone receiver. The GNSS receiver provides the GNSS position of the aircraft 100 to the integrated radio navigation receiver 102. In exemplary embodiments, the difference between GNSS position data that comes from the selected destination AIS transponder and the GNSS position data received from the GNSS receiver co-located with the integrated radio navigation receiver is computed to simulate/emulate the navigation data that would come out of a conventional VOR. From the pilot/operator's perspective, they would now have something on their display that operationally looks like a VOR. This emulation functionality makes the system easier to retrofit into older helicopters because it is not necessary to put in new displays, rather just replace the VOR receiver with this new VOR receiver that also provides the ability to display navigation data to a selected AIS transponder identifier. In exemplary embodiments, the AIS location data for the destination 104 on the destination vessel 106 and/or the other vessels or structures (including ships 108, other oil rigs 110, light houses 112, and/or wind turbines 114) and obstacles is overlaid on a map using the display system 208. In exemplary embodiments, the unique identification from the AIS transmitters is also displayed on the map next to the icon identifying the destination 104, destination vessel 106, other vessels and/or obstacles using the display system 208. In exemplary embodiments, the AIS location data for the destination 104 on the destination vessel 106 and/or the other vessels or structures (including ships 108, other oil rigs 110, light houses 112, and/or wind turbines 114) and obstacles is overlaid and/or combined with the weather radar data in the ground scanning mode using the display system 208 such that the information derived from both the AIS data and the weather radar can be viewed by the pilots and/or operators simultaneously.

In exemplary embodiments, the identifier of the AIS transponder is entered as the destination vessel or rig by the pilot/operator, such that the pilot/operator can select an object of interest to which guidance and/or navigation is required. Even in visual guidance/navigation conditions or on an aircraft without flight controls, the bearing pointer could be used to aid the pilot in identifying the direction toward the destination 104 on the destination vessel 106 (or other ship or vessel). In exemplary embodiments, the integrated navigation receiver with both (1) ILS and/or VOR and (2) AIS reception functionality could also provide an output which provides identity and location of all MS transponder installations (including ships 108, other oil rigs 110, light houses 112, wind turbines 114, etc.) in the area for presentation on a cockpit display. This could be formatted as a map display providing situational awareness to the pilot of all potential obstacles in the area.

In exemplary embodiments, the ILS and/or VOR receiver functionality of the integrated radio navigation receiver 102 would not be used operationally at the same time as the AIS data receiver functionality of the integrated radio navigation receiver 102, so the integrated radio navigation receiver 102 can be a single integrated hardware piece with no loss of capability while allowing integration of the AIS receiver functionality with the traditional ILS and/or VOR receiver functionality without adding to weight or space of avionics on the aircraft 100. In exemplary embodiments, the aircraft 100 receives continuous updates of the GNSS position of the AIS transponder on the destination vessel 106, this system can also provide guidance for a moving destination vessel 106. In exemplary embodiments, a destination vessel 106 approached from the rear travelling at a certain velocity can appear to the guidance system as having a headwind and it would integrate this error to close on the moving glidepath.

In exemplary embodiments, the integrated radio navigation receiver 102 operates in the frequency range 108.00 MHz to 117.95 MHz while in the ILS mode and operates at the AIS frequencies of 161.975 and 162.025 MHz using 9600 baud GMSK modulation with an SOTDMA (Class A) or CSTDMA (Class B) protocol while in the AIS mode to receive the identification and GNSS position data from the destination and/or surrounding vessels AIS transmitters. In exemplary embodiments, the integrated radio navigation receiver 102 would need to allow tuning of RF signals beyond the normal VOR/ILS range up to the AIS frequencies. The navigation receiver would also require processing capabilities to allow reception of the data transmitted using the SOTDMA protocol in addition to receiving VOR and ILS signals. In exemplary embodiments, the integrated radio navigation receiver 102 also integrates with a GPS receiver to allow the integrated radio navigation receiver 102 to compute the relative locations of the aircraft 100 and the AIS transponder on the destination vessel 106. The two coordinates could then be used to provide an output from the integrated radio navigation receiver 102 which simulated/emulated the output from a traditional ILS receiver, even when operating in the AIS mode.

In exemplary embodiments, the integrated radio navigation receiver 102 also provides vertical deviation guidance and/or horizontal deviation guidance to the surface vessel by emulating the ILS vertical deviation and/or horizontal deviation signals. While the AIS transponder message definition does not currently include altitude of the AIS transponder, an implementation could either assume that the vessel is at sea level or alternatively could also integrate a radar altimeter input to allow determination of height above some other surface such as a lake. Alternatively, the pilot/operator could enter the height of the platform. While the GPS data from airborne GPS receivers do include altitude data, AIS signals do not today include the altitude of the AIS transponder.

In exemplary embodiments, the AIS transponder standard is updated to include a provision to transmit altitude of the transponder in the AIS transponder signals. In exemplary embodiments, in order to compute a vertical deviation from the glidepath to the remote AIS transponder, it is necessary to know the altitude of the remote device. In exemplary embodiments where the aircraft is traveling over bodies of water that are not oceans, an assumption that the AIS transmitter is at sea level would be inaccurate. In exemplary embodiments, an altimeter (such as a radar altimeter) can be used to provide altitude data for the AIS transmitter. In specific exemplary implementations, the aircraft uses a radar altimeter to determine its height above the water and computes an estimate of the remote AIS transmitter's altitude based on the aircraft's height above the water, the altitude of the aircraft determined by GNSS signals and/or another altimeter, and/or foreknowledge about the AIS transmitter's height above the water. In other exemplary embodiments, the AIS transmitter would transmit data regarding the altitude of the AIS transmitter produced based on altimeters or GNSS signals received at the AIS transmitter.

In exemplary embodiments, the integrated radio navigation receiver 102 is configured to display all surface traffic in the area by providing a signal with a representations of the GNSS positions of all the vessels in the area for display on a cockpit display. In exemplary embodiments, the user interface provides for entry of an along track and/or cross track offset for the bottom of descent location, which allows the aircraft 100 to reach the bottom of descent prior to the destination vessel 106 and give the pilot space to turn and land on the destination vessel 106.

Figure 2A:
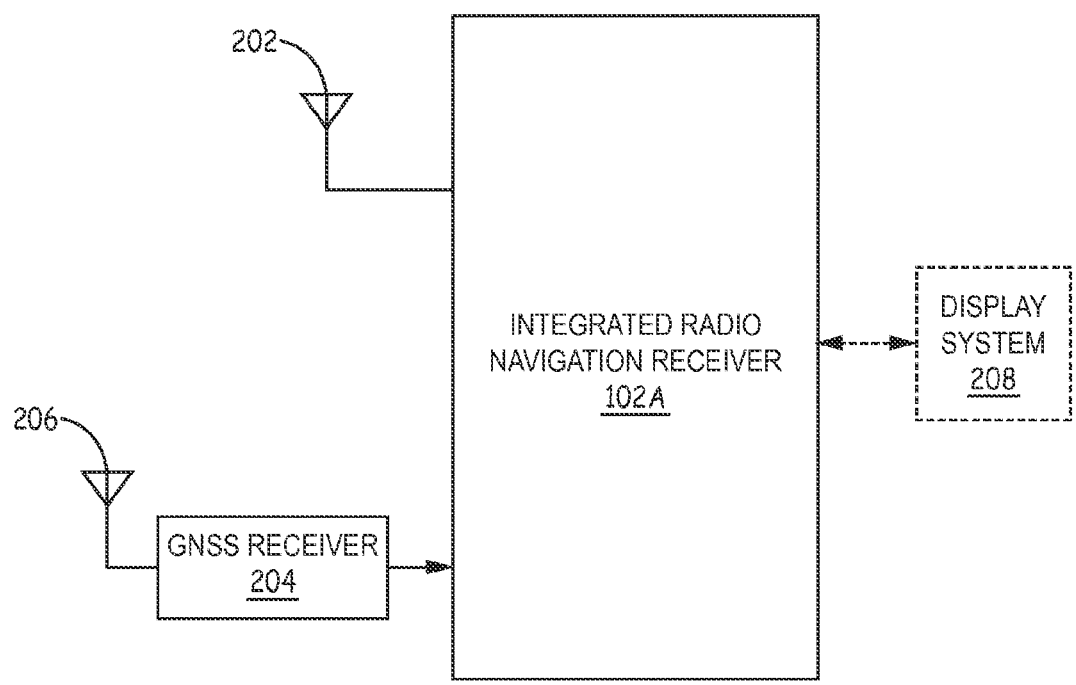
FIGS. 2A-2C are block diagrams depicting exemplary embodiments of an integrated radio navigation receiver for receiving: (1) landing guidance (e.g. VOR and/or ILS) signals while in a first operation mode and (2) AIS signals while in a second operation mode using the single integrated radio navigation system receiver connected to at least one antenna.
Figure 2B:
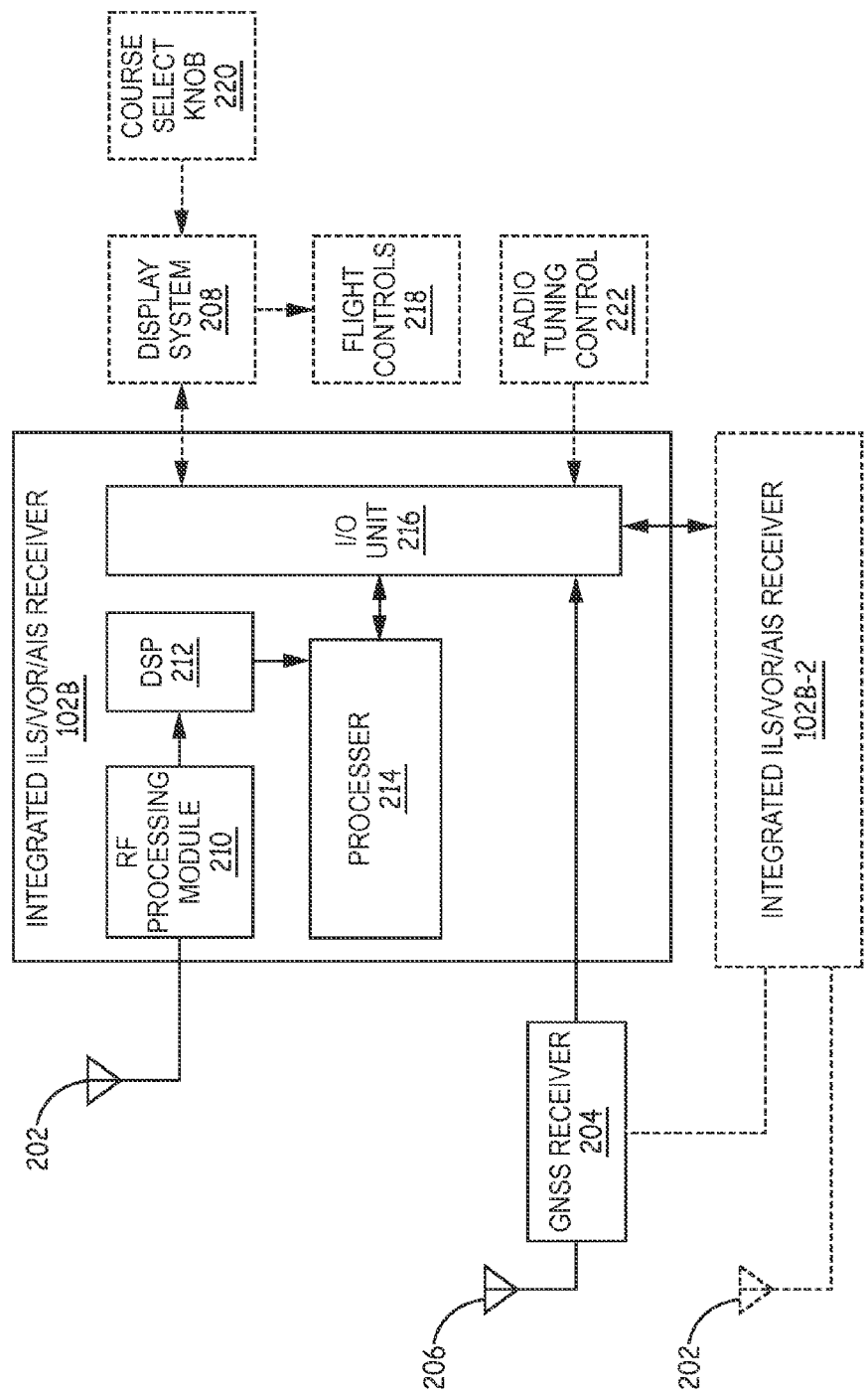
Figure 2C:
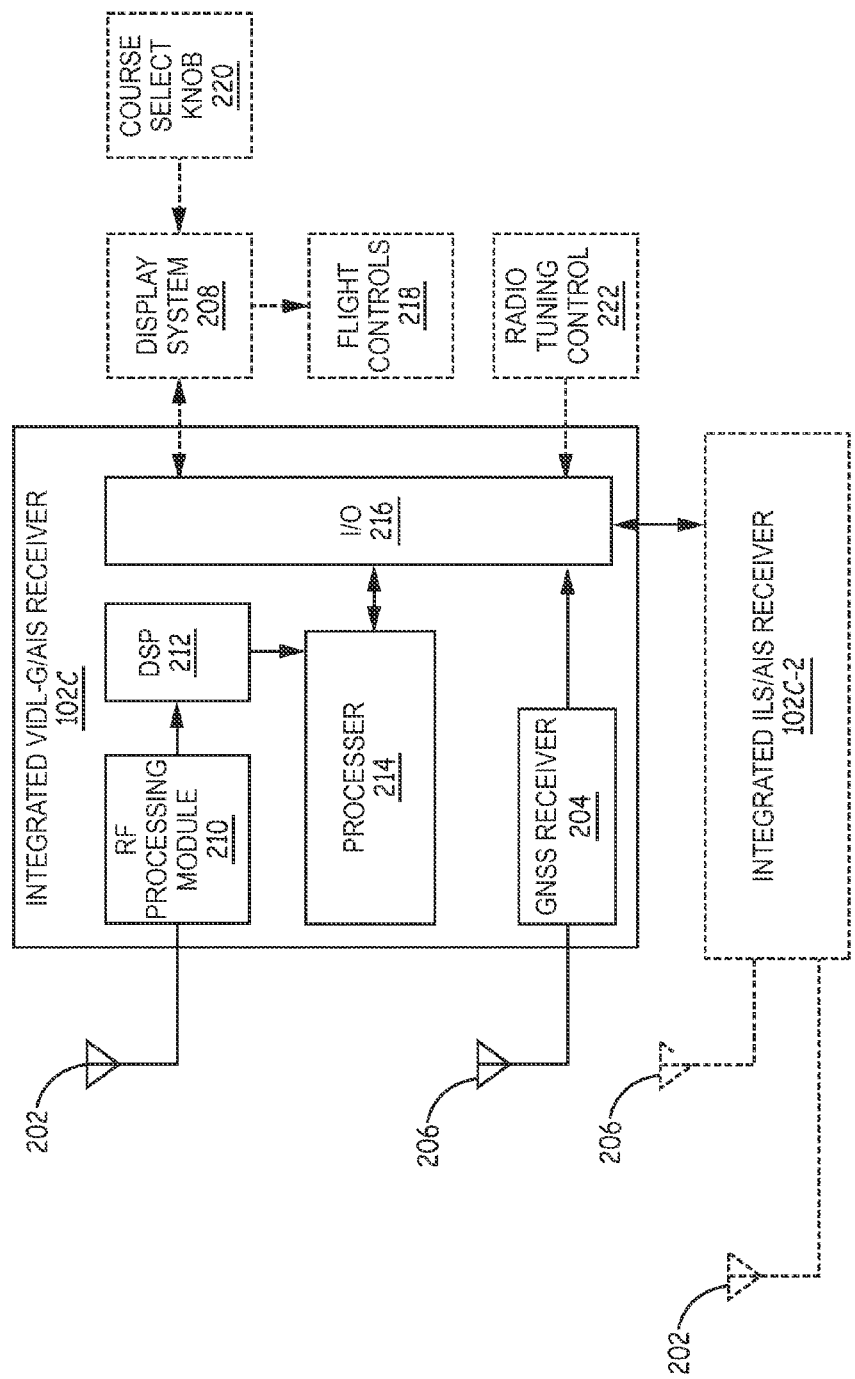

FIGS. 2A-2C are block diagrams depicting exemplary embodiments of an integrated radio navigation receiver 102 for receiving both (1) landing guidance (e.g. ILS and/or VOR) signals and (2) Automatic Identification System (AIS) signals using the single integrated radio navigation receiver 102 connected to the at least one antenna 202. Each of FIGS. 2A-2C illustrates a different embodiment of integrated radio navigation receiver 102, labeled 102A-102C respectively.

FIG. 2A is a block diagram depicting an exemplary embodiment of an integrated radio navigation receiver 102A for receiving both (1) landing guidance (e.g. ILS and/or VOR) signals and (2) Automatic Identification System (AIS) signals using the single integrated radio navigation receiver 102A connected to the at least one antenna 202. In exemplary embodiments, the integrated radio navigation receiver 102A is configured to: (1) receive the landing guidance (e.g. ILS and/or VOR) signals while operating in a first mode and (2) receive Automatic Identification System (AIS) signals while operating in a second mode. In exemplary embodiments, the integrated radio navigation receiver 102A is also communicatively coupled to a GNSS receiver 204 that is connected to an antenna 206. In exemplary embodiments, the integrated radio navigation receiver 102A is also communicatively coupled to a display system 208. In exemplary embodiments, a human-machine interface that is either part of display system 208 or connected to it provides a means for the pilot to select the mode of operation. In exemplary embodiments, the display system 208 is a Multifunction Control Display Unit (MCDU) that includes a human-machine interface that allows for both input and display to the pilot/operator.

In exemplary embodiments, the first mode is selected when the aircraft is attempting to land at a ground based destination and it is desirable to use landing guidance signals (such as ILS and/or VOR signals). In contrast, the second mode is selected when the aircraft is attempting an off-shore landing or rendezvous with an object, such as on an oil rig, ship or wind turbine and it is desirable to use AIS signals. In exemplary embodiments, the at least one antenna includes at least one of a nose mounted antenna mounted on or in the nose of the aircraft and a tail mounted antenna mounted on or in the tail of the aircraft. In exemplary embodiments, the at least one antenna includes both the nose mounted antenna and the tail mounted antenna. In exemplary embodiments, the nose mounted antenna is an ILS antenna. In exemplary embodiments, the tail mounted antenna is a VOR antenna. In exemplary embodiments, the aircraft may include a vertically polarized VHF antenna for receiving AIS signals in addition to the horizontally polarized antenna used for VOR and ILS signals.

When operating in the first mode, the integrated radio navigation receiver 102A is configured to receive landing guidance signals (such as ILS and/or VOR signals) from the at least one antenna 202 and uses these guidance signals to guide the aircraft 100 in a approach for landing. In exemplary embodiments, the ILS signal indicates any aircraft deviation from a specific approach path by measuring the difference in modulation of two separate beams. This deviation signal aids in keeping the aircraft on the specific approach path. More specifically, Instrument Landing System (ILS) uses VHF and UHF radio signals to guide the aircraft down onto runways automatically by sending localizer (VHF) signals for the lateral axis and/or glide slope (UHF) beacon signals for the vertical axis from ground transmitters. Aircraft 100 uses the lateral and vertical deviation signals from the localizer and glide slope beacon signals, to guide the aircraft to land onto the runway. In exemplary embodiments, a nose mounted antenna and/or tail mounted antenna are used to receive VOR and/or ILS signals in the 108-118 MHz band.

When operating in the second mode, the integrated radio navigation receiver 102A is configured to receive AIS signals from the at least one antenna 202 and uses these AIS signals to know the current position of the destination 104 on the destination vessel 106 on the water (such as a oil rig, ship, wind turbine or another destination equipped with an AIS transmitter). The integrated radio navigation receiver 102A also receives GNSS data regarding the aircraft 100 from the GNSS receiver 204. In exemplary embodiments, the integrated radio navigation receiver 102A is further configured to determine a flight path based on the GNSS data regarding the aircraft's current position and the current position of the destination 104 on destination vessel 106 on the water. In exemplary embodiments, the integrated radio navigation receiver 102A also receives AIS signals from other vessels and/or obstacles on or in the water (such as ships 108, oil rigs 110, light houses 112, and/or wind turbines 114) that can be obstacles for the landing of the aircraft at the destination 104 on the destination vessel 106 in the water. In exemplary embodiments, the integrated radio navigation receiver 102A is further configured to determine the flight path based on the GNSS data regarding the aircraft's current position and the current position of both the landing destination and the other things in the water that can be obstacles for the aircraft at the destination.

FIG. 2B is a block diagram depicting an exemplary embodiment of an integrated ILS/VOR/AIS receiver 102B for receiving both (1) ILS and/or VOR signals and (2) AIS signals using the single integrated ILS/VOR/AIS receiver 102B connected to the at least one antenna 202. Integrated ILS/VOR/AIS receiver 102B includes similar functionality to integrated radio navigation receiver 102A, but is more specific compared to the more generalized integrated radio navigation receiver 102A. Integrated ILS/VOR/AIS receiver 102B includes a radio frequency (RF) processing module 210, a digital signal processor (DSP) 212, a processor 214, and an input/output (I/O) unit 216 (or other communication unit). In exemplary embodiments, the I/O unit 216 is communicatively coupled to a GNSS receiver 204 external to the integrated ILS/VOR/AIS receiver 102B. In exemplary embodiments, the I/O unit 216 is also communicatively coupled to the display system 208, which is communicatively coupled to flight controls 218 and a course select knob 220. In exemplary embodiments, the I/O unit 216 is also communicatively coupled to a radio tuning control 222.

In exemplary embodiments, a human-machine interface that is either part of or communicatively coupled to the display system 208 is configured to receive a mode selection from a user (such as a pilot and/or operator). In exemplary embodiments, when the first mode is selected the RF processing module 210 is configured to receive landing guidance signals used for traditional ground based landing, such as ILS and/or VOR signals, and to pass these signals onto the DSP 212. In contrast, when the second mode is selected the RF processing module 210 is configured to receive AIS signals and to pass them onto the DSP 212. The DSP 212 processes the signals (such as by processing the waveform) received from the RF processing module 210 and passes them onto the processor 214.

When operating in the first mode, the processor 214 takes the processed guidance signals (such as ILS and/or VOR signals) received from the DSP 212 and generates output for the display system 208 from the processed guidance signals. In exemplary embodiments, the generated output includes a bearing to the desired ground-based landing destination. In other embodiments, the generated output includes waypoints to be followed by an auto-pilot and/or manually by a pilot to conduct the approach.

When operating in the second mode, the processor 214 takes the processed AIS signal received from the DSP 212 and generates an output for the display system 208 from the processed guidance signals. In exemplary embodiments, the generated output includes a bearing to the current position of the destination 104 on the destination vessel 106 on the water. In exemplary embodiments, the generated output includes a computed glide path and lateral and vertical deviation indications from the computed glide path. These deviation indications can be used to navigate to that location. In exemplary embodiments, the processor 214 is configured to generate a desired flight path between the aircraft's current position (received from the GNSS receiver 204) and the current position of the destination 104 received from the remotely located automatic identification system (AIS) transmitter positioned at the destination 104. In exemplary embodiments, the processor 214 is configured to compute at least one of a lateral deviation and a vertical deviation between an actual flight path of the aircraft and the desired flight path of the aircraft. In exemplary embodiments, the processor 214 is configured to output at least one of the lateral deviation and the vertical deviation to an external device. In exemplary embodiments, this is an emulation of functionality that current ILS/VOR receivers can do, just using the AIS data rather than ILS/VOR data.

In exemplary embodiments, the processor 214 is further configured to track positions of a plurality of remotely located automatic identification system (AIS) transmitters, which may be positioned at the destination 104, destination vessel 106, ships 108, oil rigs 110, light houses 112, wind turbines 114, etc. In exemplary embodiments, the generated output includes waypoints to be followed by an auto-pilot and/or manually by a pilot for approach to the destination 104 on the destination vessel 106 on the water. Specifically, the processor 214 is configured to determine a flight path based on the GNSS data regarding the aircraft's current position (received from the GNSS receiver 204) and the current position of the destination 104 on destination vessel 106 on the water. In exemplary embodiments, the processor 214 also receives AIS signals via the DSP 212 and RF processing module 210 from other vessels and/or obstacles on or in the water (such as ships 108, oil rigs 110, light houses 112, and/or wind turbines 114) that can be obstacles for the landing of the aircraft at the destination 104 on the destination vessel 106 in the water. In exemplary embodiments, the processor 214 is further configured to determine the flight path based on the GNSS data regarding the aircraft's current position received from the GNSS receiver 204 and the current position of both the landing destination and the other vessels and/or obstacles in the water that can be obstacles for landing of the aircraft at the landing destination based on a plurality of AIS signals received at the processor 214 via the DSP 212 and RF processing module 210.

AIS data is typically transmitted on two frequencies reserved for the AIS system. AIS1 is 161.975 MHz and AIS 2 is 162.025 Mhz. In exemplary implementations, it is desirable to be able to simultaneously receive on both channels, to ensure data from all transmitters is received. In exemplary embodiments, the receiver is unable to monitor both channels simultaneously and the exemplary embodiments include two separate receivers which are coordinated to ensure that each is tuned to a separate frequency. In this exemplary dual receiver configuration, the data from each side is then communicated to the offside receiver so that the processor in each receiver has access to all the received AIS data. In specific exemplary embodiments, an optional second integrated ILS/VOR/AIS receiver 102B-2 includes similar components and functionality to integrated ILS/VOR/AIS receiver 102B. In exemplary embodiments when operating in AIS mode, the integrated ILS/VOR/AIS receiver 102B is tuned to a first AIS frequency while the optional second integrated ILS/VOR/AIS receiver 102B-2 is tuned to a second AIS frequency. Data regarding the signals from the first and/or second AIS frequencies is communicated between the integrated ILS/VOR/AIS receiver 102B and the optional second integrated ILS/VOR/AIS receiver 102B-2 (such as through an optional communication bus). This enables the aircraft 100 to receive a plurality of AIS frequencies when operating in the AIS mode.

In exemplary embodiments, the user interface integrated into or communicatively coupled to the display system 208 provides a means for the pilot to select the mode of operation. In exemplary embodiments when operating in the second AIS mode, the user interface integrated into or communicatively coupled to the display system 208 allows entry or selection of a specific AIS transponder identifier to which the pilot/operator desires guidance. In exemplary embodiments, in order for the receiver to compute a cross track deviation to allow emulation of the ILS and/or VOR data, the pilot needs to enter an inbound course to the AIS transponder on the surface. In exemplary embodiments, this is done using the course select knob 220 that is used with the integrated ILS/VOR/AIS receiver 102B. In exemplary embodiments, approaches to the destination 104 on the destination vessel 106 in the water are performed with the approach course slightly to the left or right of the selected destination. This allows the aircraft to fly past the destination should the pilot not acquire visual contact with the oil rig or ship. If the pilot spots the oil rig or ship visually, they may turn to approach the destination visually. In exemplary embodiments, a lateral offset distance for the approach course can be entered by the pilot to either the left or right of the surface rig/vessel.

FIG. 2C is a block diagram depicting an exemplary embodiment of an integrated VOR/ILS Data Link with GPS and AIS (VIDL-G/AIS) receiver 102C for receiving both (1) ILS and/or VOR signals and (2) AIS signals using the single integrated VIDL-G/AIS receiver 102C connected to the at least one antenna 202. Integrated VIDL-G/AIS receiver 102C includes similar functionality to integrated ILS/AIS receiver 102B. The only differences are that the integrated VIDL-G/AIS receiver 102C is configured to receive both VOR and ILS data link and that integrated VIDL-G/AIS receiver 102C also includes the GNSS receiver 204 as part of the integrated VIDL-G/AIS receiver 102C.

In exemplary embodiments, an optional second integrated VIDL-G/AIS receiver 102C-2 includes similar components and functionality to integrated VIDL-G/AIS receiver 102C. In exemplary embodiments when operating in AIS mode, the integrated VIDL-G/AIS receiver 102C is tuned to a first AIS frequency while the optional second integrated VIDL-G/AIS receiver 102C-2 is tuned to a second AIS frequency. Data regarding the signals from the first and/or second AIS frequencies is communicated between the integrated VIDL-G/AIS receiver 102B and the optional second integrated VIDL-G/AIS receiver 102C-2 (such as through an optional communication bus). This enables the aircraft 100 to receive a plurality of AIS frequencies when operating in the AIS mode.

Figure 3:
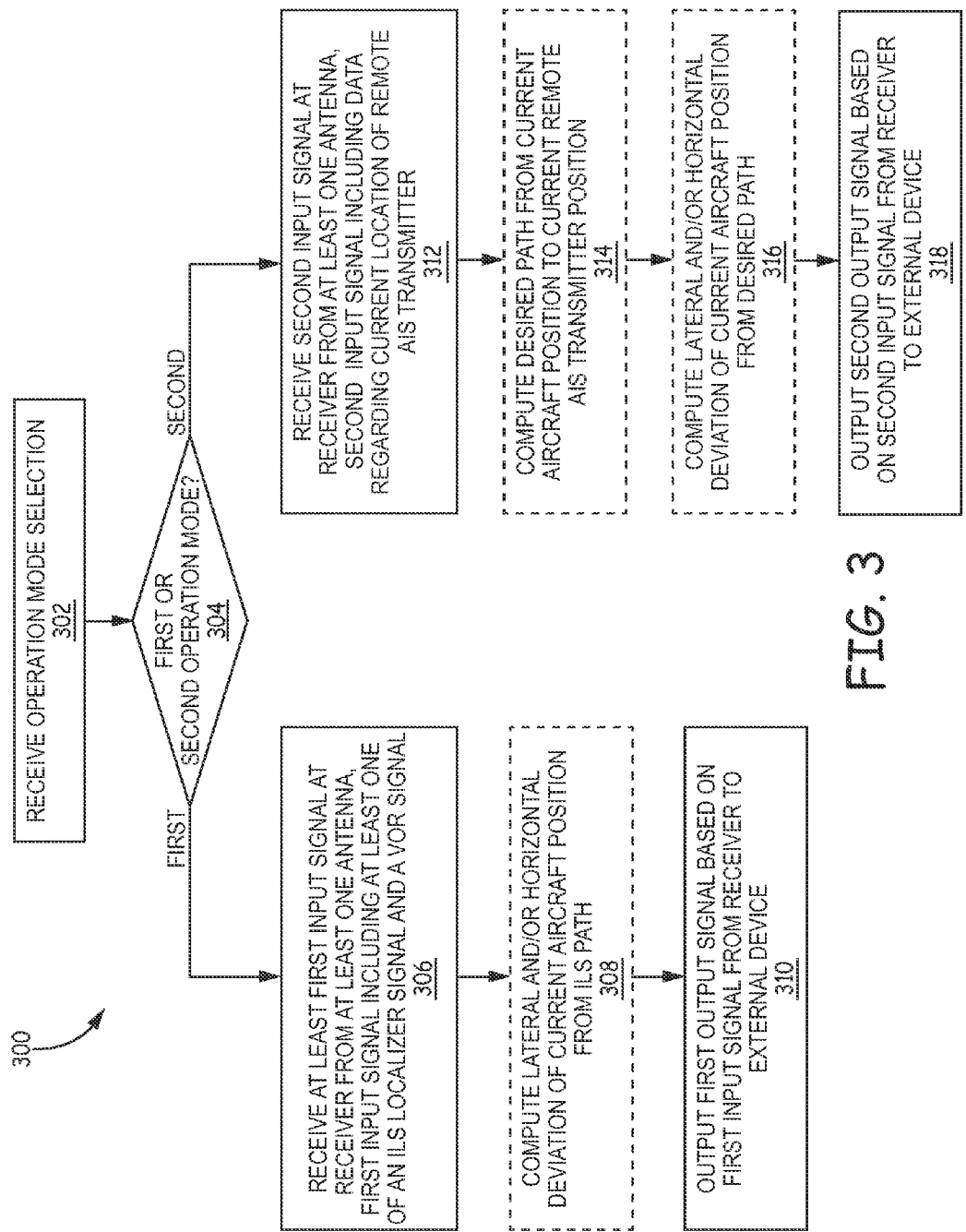
FIG. 3 is a flow chart illustrating an exemplary method for receiving various types of signals using a single receiver.

FIG. 3 is a flow chart illustrating an exemplary method 300 for receiving various types of signals using a single receiver. Exemplary method 300 begins at block 302 with receiving an operation mode selection.

Exemplary method 300 proceeds to decision block 304 with deciding whether a first or second operation mode was selected. Exemplary method 300 branches to block 306 with when a first operation mode is selected, to receive at least a first input signal at a receiver from at least one antenna, the first input signal including at least one of an instrument landing system (ILS) signal and a VHF omni ranging (VOR) signal. Exemplary method 300 proceeds to optional block 308 with computing a lateral and/or horizontal deviation of the current aircraft position from an ILS path based on ILS signals received from ground transmitters. Exemplary method 300 proceeds to block 310 with outputting a first output signal based on the first input signal form the receiver to an external device. In exemplary embodiments, the first output signal includes at least one of the lateral deviation and/or horizontal deviation of the current aircraft position from the ILS path. In exemplary embodiments of exemplary method 300, the first operation mode is at least one of an instrument landing system (ILS) mode and a GNSS landing system (GLS) mode. In exemplary embodiments of exemplary method 300, the external device is a display system.

If at decision block 304 it is determined that a second operation mode was selected, then exemplary method 300 branches to block 312 with when a second operation mode is selected, receiving a second input signal at the receiver from the at least one antenna, the second input signal including data regarding a current location of a remote AIS transmitter. In exemplary embodiments, the remote AIS transmitter is located at a desired destination. In exemplary embodiments, the remote AIS transmitter is located at an object of interest, such as a potential obstacle. Exemplary method 300 proceeds to optional block 314 with computing a desired path from the current aircraft position to the current remote AIS transmitter position. Exemplary method 300 proceeds to optional block 316 with computing a lateral and/or horizontal deviation of the current aircraft position from the desired path. Exemplary method 300 then proceeds to block 318 with outputting a second output signal based on the second input signal from the receiver to the external device. In exemplary embodiments, the second output signal includes at least one of the lateral deviation and/or the horizontal deviation of the current aircraft position from the desired path. In exemplary embodiments, the second output signal includes data regarding both the current aircraft position and the current remote AIS transmitter position. In exemplary embodiments, the second output signal includes data regarding the current position of a plurality of remote AIS transmitters. In exemplary embodiments, In exemplary embodiments of exemplary method 300, the second operation mode is an automatic identification system (AIS) mode.

In exemplary embodiments of exemplary method 300, the first input signal occupies a first frequency range, while the second input signal occupies a second frequency range; and the first frequency range and the second frequency range do not overlap.

Figure 4:
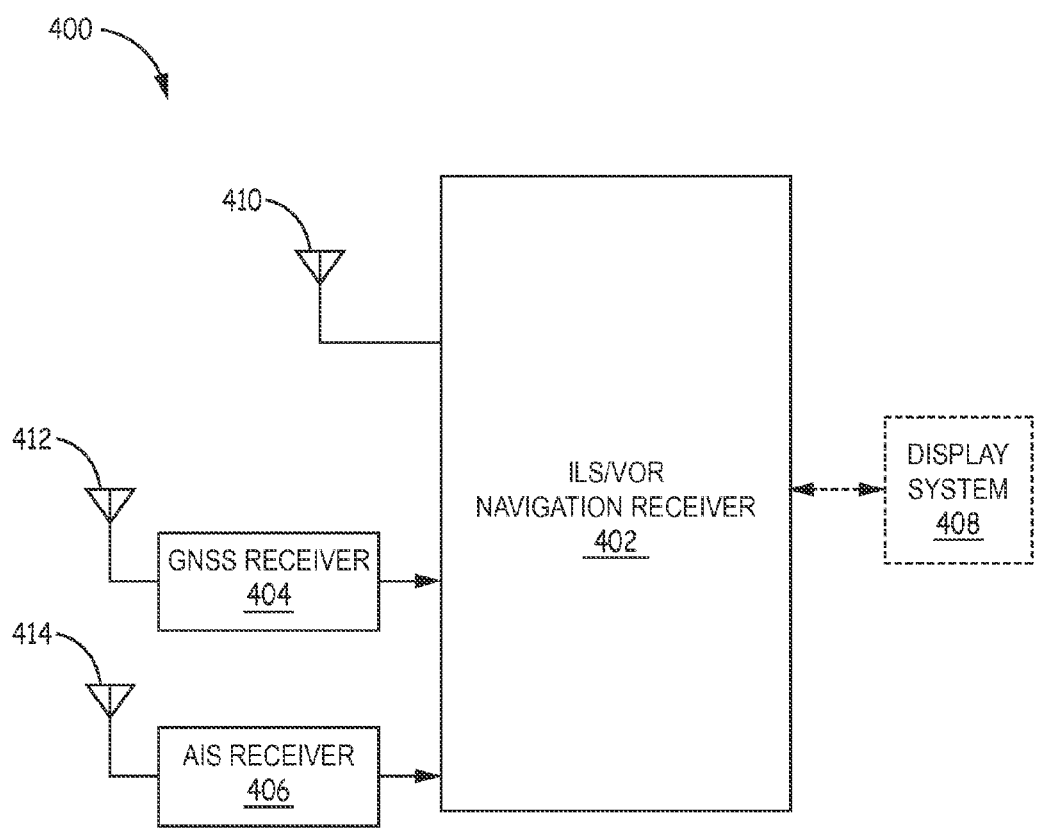
FIG. 4 is a block diagram depicting an exemplary embodiment of a radio navigation system including an ILS/VOR navigation receiver, a GNSS receiver, and an AIS receiver.

FIG. 4 is a block diagram depicting an exemplary embodiment of a radio navigation system 400 including an ILS/VOR navigation receiver 402, a GNSS receiver 404, and AIS receiver 406. In exemplary embodiments, the ILS/VOR navigation receiver 402 outputs to a display system 408 (or other external device). In exemplary embodiments, the ILS/VOR navigation receiver 402 receives ILS and/or VOR signals using antenna 410. In exemplary embodiments, the ILS/VOR navigation receiver 402 receives GNSS data from the GNSS receiver 404 received from GNSS satellites through antenna 412. In exemplary embodiments, the ILS/VOR navigation receiver 402 receives AIS data from the AIS receiver 406 received from remotely located AIS transmitters through antenna 414.

When operating in the ILS/VOR mode, the ILS/VOR navigation receiver 402 operates similarly to the integrated radio navigation receivers 102A-102C described above. The differences between the embodiment shown in FIG. 4 from those shown in FIGS. 2A-2C are that the ILS/VOR navigation receiver 402 is not configured to receive both the ILS/VOR signals and AIS signals through antenna 410. Rather than receiving the AIS signals through the same antennas 410 as the ILS/VOR signals, ILS/VOR navigation receiver 402 receives AIS data from the AIS receiver 406. In exemplary embodiments, the AIS data provided by the AIS receiver 406 to the ILS/VOR navigation receiver 402 is not formatted in a usable way for the display system 408 and while operating in an AIS communication mode, the ILS/VOR navigation receiver 402 generates a new signal that is communicated to the display system 408 and is formatted in a usable way for the display system 408.

In other exemplary embodiments, the AIS data provided by the AIS receiver 406 to the ILS/VOR navigation receiver 402 is formatted in a usable way for the display system 408 and while operating in the AIS communication mode, the ILS/VOR navigation receiver 402 communicates the AIS data in a signal to the display system 408. In exemplary embodiments where the AIS data provided by the AIS receiver 406 to the ILS/VOR navigation receiver 402 is formatted in a usable way for the display system 408, the AIS receiver 406 itself is configured to output the AIS data in a format typically associated with the ILS/VOR data that is sent in the output signal to the display system 408.

Figure 5:
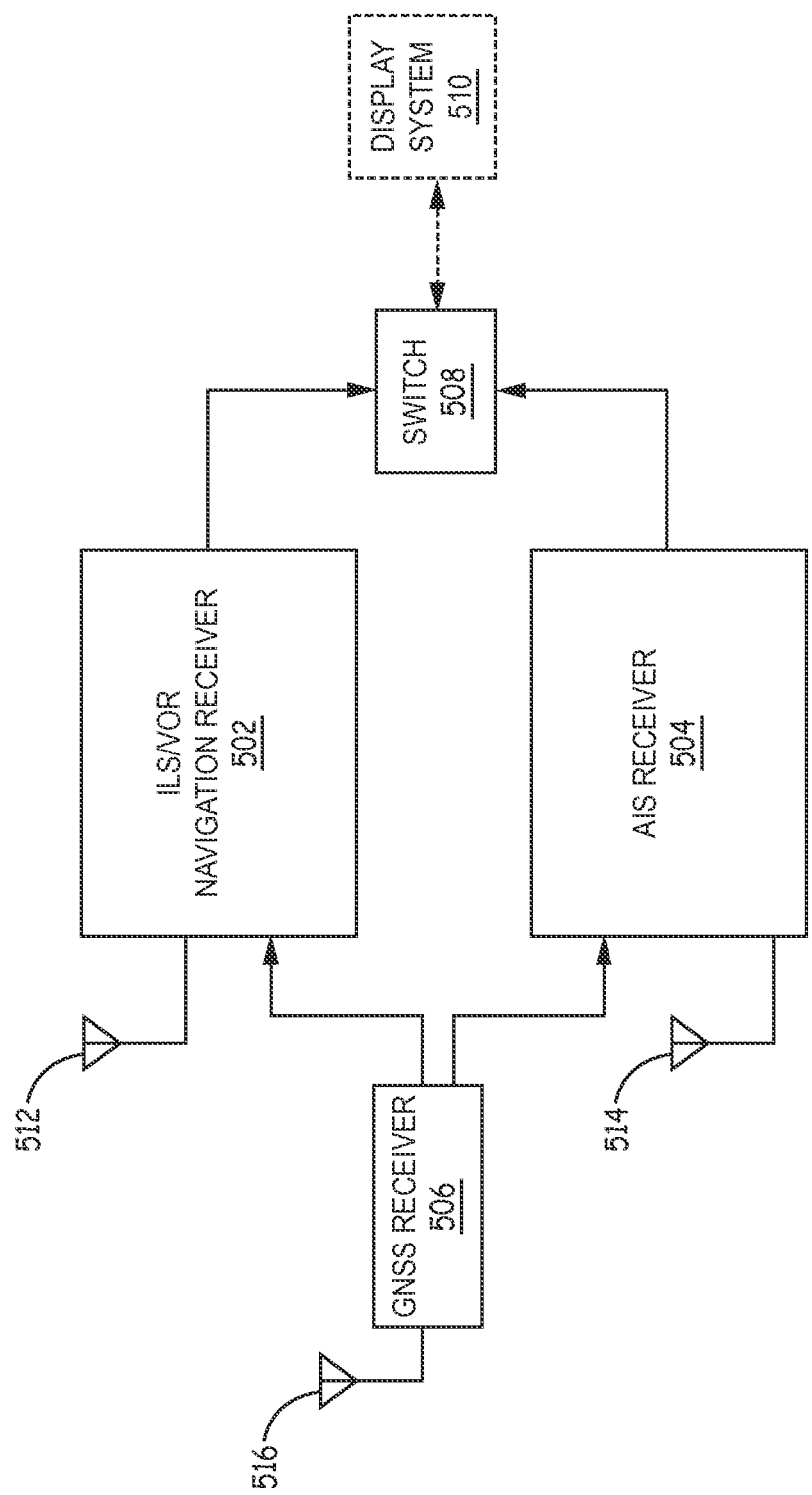
FIG. 5 is a block diagram depicting an exemplary embodiment of a radio navigation system including an ILS/VOR navigation receiver, an AIS receiver, a GNSS receiver, and a switch.

FIG. 5 is a block diagram depicting an exemplary embodiment of a radio navigation system 500 including an ILS/VOR navigation receiver 502, an AIS receiver 504, a GNSS receiver 506, and a switch 508. In exemplary embodiments, the ILS/VOR navigation receiver 502 outputs signals having a first formatting to the switch 508. Similarly, the AIS receiver 504 outputs signals having the first formatting to the switch 508. The switch 508 can be toggled between the signals output from the ILS/VOR navigation receiver 502 and the AIS receiver 504 for output to a display system 510 (or other external device). In exemplary embodiments, the display system 510 is configured to receive signals having the first formatting. In exemplary embodiments, the first formatting is typically used in the ILS/VOR navigation receiver 502 output to a display system 510, but is different from the formatting output from AIS receivers 504. Accordingly, the AIS receiver 504 is configured to output the signals to the switch 508 in the first formatting, so the switch 508 can simply toggle between the two signals to effectively toggle between the two modes: ILS/VOR mode and AIS mode.

Figure 6:
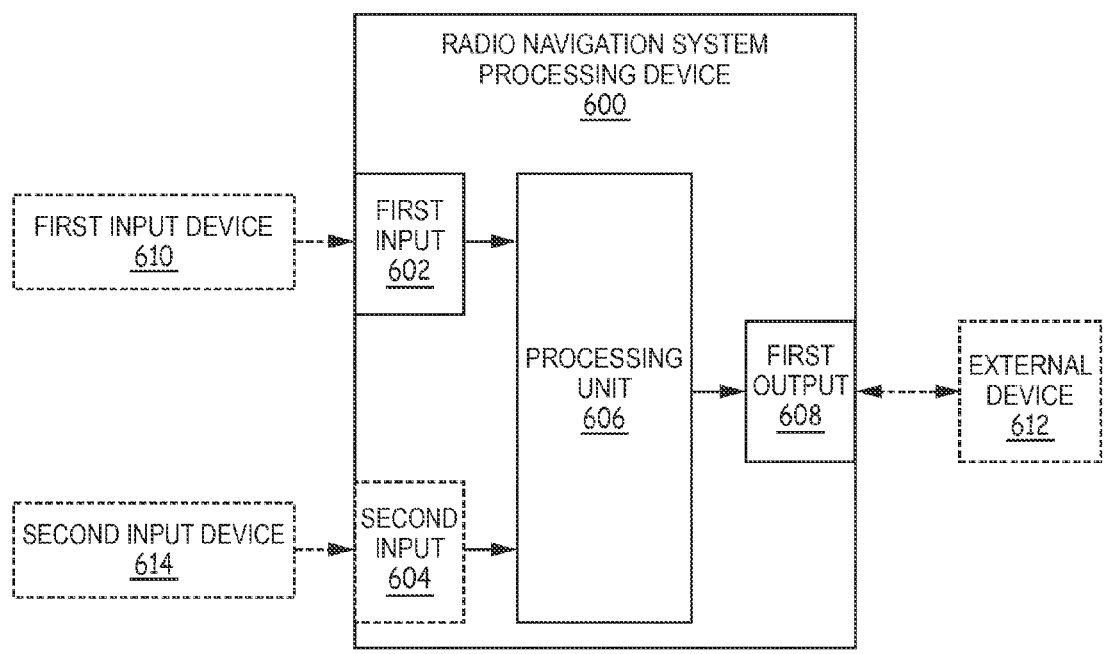
FIG. 6 is a block diagram depicting an exemplary embodiment of a radio navigation signal emulation unit for integrating signals received from two different radio navigation receivers.

FIG. 6 is a block diagram depicting an exemplary embodiment of a radio navigation system processing device 600 for generating an emulated navigation signal. In exemplary embodiments, the radio navigation signal emulation unit 600 includes a first input 602, an optional second input 604, a processing unit 606, and a first output 608. In exemplary embodiments, the first input 602 is communicatively coupled to a first input device 610 and configured to receive a first radio navigation signal having a first formatting from the first input device 610. In exemplary embodiments, the first input device 610 is a first radio navigation receiver. In exemplary embodiments, the first input device 610 is a radio navigation receiver configured to output signals based on an automatic identification system (AIS) signal received at the first input device 610 from at least one remotely located automatic identification system (AIS) transmitter.

In exemplary embodiments, the processing unit 608 is configured to generate a first emulated radio navigation signal from the first radio navigation signal, the first emulated radio navigation signal having a second formatting different from the first formatting. In exemplary embodiments, the first output 608 is configured to communicate the second emulated navigation signal to the external device 612, wherein the external device is configured to accept radio navigation signals having the second formatting.

In exemplary embodiments including the optional second input 604, the optional second input 604 is communicatively coupled to an optional second input device 614 and configured to receive a second radio navigation signal having the second formatting from the second input device 614. In exemplary embodiments, the second input device 614 is a second radio navigation receiver. In exemplary embodiments, the second input device 614 is a radio navigation receiver configured to output signals based on at least one of an instrument landing system (ILS) signal and a VHF omni ranging (VOR) signal received at the second input device 614 from at least one of a remotely located instrument landing system (ILS) signal transmitter and a VHF omni ranging (VOR) signal transmitter.

In exemplary embodiments having the optional second input 604, the radio navigation signal emulation unit 600 operates in two modes. While operating in the first mode, the first output 608 is configured to communicate the second emulated radio navigation signal to the external device 612. While operating in the second mode, the second output 608 is configured to communicate the second radio navigation signal to the external device 612. In exemplary embodiments, the first radio navigation signal is based on an automatic identification system (AIS) signal received from at least one remotely located automatic identification system (AIS) transmitter and the second radio navigation signal is based on an instrument landing system (ILS) signal received from a remotely located instrument landing system (ILS) transmitter. In exemplary embodiments, the radio navigation system processing device 600 is a part of at least one of a stand alone AIS receiver and an integrated ILS and/or VOR and AIS receiver configured to generate an emulated ILS and/or VOR signal based on an AIS signal.

As used in this description, a processing unit, digital signal processor (DSP), digital processor, etc. (such as, but not limited to, DSP 212, processor 214, and processing unit 606 described above and shown in the Figures) includes or functions with software programs, firmware or other computer readable instructions for carrying out various methods, process tasks, calculations, and control functions, used in the integrated radio navigation receivers, systems, and methods described above. These instructions are typically stored on any appropriate computer readable medium (such as, but not limited to, memory) used for storage of computer readable instructions or data structures. The computer readable medium can be implemented as any available media that can be accessed by a general purpose or special purpose computer or processor, or any programmable logic device. Suitable processor-readable media may include non-transitory storage or memory media such as magnetic or optical media. For example, non-transitory storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

EXAMPLE EMBODIMENTS

Example 1 includes a receiver comprising: a radio frequency module configured to receive and down convert multiple types of radio frequency signals received from at least one antenna; a communication unit configured to communicate signals with at least one external device; a processing unit communicatively coupling the radio frequency module with the communication unit; wherein the processing unit is configured to receive an operation mode selection; wherein when a first operation mode is selected: the processing unit is configured to receive at least a first input signal from the at least one antenna via the radio frequency module, the at least the first input signal including at least one of an instrument landing system (ILS) signal and a VHF omni ranging (VOR) signal; and the processing unit is configured to output a first output signal based on the first input signal to the external device; and wherein when a second operational mode is selected: the processing unit is configured to receive at least a second input signal from the at least one antenna via the radio frequency module, the at least the second input signal including an automatic identification system (AIS) signal including data regarding a current location of at least one remotely located transmitting device; and the processing unit is configured to output a second output signal based on the at least the second input signal to the external device.

Example 2 includes the receiver of Example 1, wherein the at least one remotely located transmitting device includes a plurality of remotely located automatic identification system (AIS) transmitters broadcasting position data from a plurality of locations, wherein the at least the second input signal includes the position data from the plurality of remotely located automatic identification system (AIS) transmitters.

Example 3 includes the receiver of Example 2, further comprising: wherein the processing unit is further configured to track positions of the plurality of remotely located automatic identification system (AIS) transmitters; and wherein the processing unit is further configured to generate the second output signal based on the positions of the plurality of remotely located automatic identification system (AIS) transmitters.

Example 4 includes the receiver of any of Examples 1-3, wherein the at least the second input signal includes automatic identification system (AIS) signals broadcast from a plurality of remotely located automatic identification system (AIS) transmitters; and wherein the external device includes an interface that allows selection of a specific remotely located automatic identification system (AIS) transmitter of the plurality of remotely located automatic identification system (AIS) transmitters; and when the second operation mode is selected: wherein the processing unit is further configured to generate the second output signal by generating at least one guidance signal from a first current location of the receiver to a second current location of the specific remotely located automatic identification system (AIS) transmitter.

Example 5 includes the receiver of Example 4, further comprising: when the second operation mode is selected: wherein the processing unit is configured to receive a global navigation satellite system (GNSS) signal from a global navigation satellite system (GNSS) antenna; and wherein the first current location of the receiver is based on the global navigation satellite (GNSS) signal.

Example 6 includes the receiver of any of Examples 1-5, further comprising: when the second operation mode is selected: wherein the processing unit is configured to receive a global navigation satellite system (GNSS) signal from a global navigation satellite system (GNSS) antenna, the global navigation satellite system (GNSS) signal including data regarding a current location of the receiver; and wherein the processing unit is configured to generate at least one of guidance information and navigation information based on the data regarding the current location of the receiver and the data regarding the current location of a desired destination remotely located transmitting device of the at least one remotely located transmitting device, wherein the second output signal includes the at least one of guidance information and navigation information.

Example 7 includes the receiver of any of Examples 1-6, wherein the external device is at least one of a display system and a flight control system.

Example 8 includes the receiver of Example 7, further comprising: when the second operation mode is selected: wherein the receiver is configured to generate the second output signal by emulating the format of the first output signal, such that both the first output signal and the second output signal are formatted with common formatting expected by the display system.

Example 9 includes the receiver of Example 8, further comprising: wherein the first output signal includes information relating to a bearing from the receiver to a second desired destination based on the at least one of an instrument landing system (ILS) signal and a VHF omni ranging (VOR) signal; wherein the second output signal includes information relating to a bearing from the receiver to the desired destination.

Example 10 includes the receiver of any of Examples 1-9, further comprising: wherein the external device is a display system; and when the second operation mode is selected: wherein the processing unit is configured to receive a global navigation satellite system (GNSS) signal from a global navigation satellite system (GNSS) antenna; wherein the receiver is configured to generate the second output signal by emulating the format of the first output signal, such that both the first output signal and the second output signal are formatted with common formatting expected by the display system; wherein the first output signal includes information relating to a bearing from the receiver to a desired destination based on the at least one of an instrument landing system (ILS) signal and a VHF omni ranging (VOR) signal; and wherein the second output signal includes information relating to at least one of a selected course deviation and a bearing from the receiver to the desired destination based on both the at least the second input signal and the global navigation satellite system (GNSS) signal.

Example 11 includes a method for receiving various types of signals using a single receiver, the method comprising: receiving an operation mode selection; when a first operation mode is selected: receiving at least a first input signal at a receiver from at least one antenna, the first input signal including at least one of an instrument landing system (ILS) signal and a VHF omni ranging (VOR) signal; and outputting a first output signal based on the first input signal from the receiver to an external device; and when a second operation mode is selected: receiving at least a second input signal at the receiver from the at least one antenna, the at least the second input signal including at least one automatic identification system (AIS) signal including data regarding a current location of at least one remotely located transmitting device; and outputting a second output signal based on the at least the second input signal from the receiver to the external device.

Example 12 includes the method of Example 11, wherein the at least one remotely located transmitting device includes a plurality of automatic identification system (AIS) transmitters broadcasting data from a plurality of locations, wherein the at least the second input signal includes the position data from the plurality of remotely located automatic identification system (AIS) transmitters.

Example 13 includes the method of Example 12, further comprising: tracking positions of the plurality of remotely located automatic identification system (AIS) transmitters; and generating the second output signal based on the positions of the plurality of remotely located automatic identification system (AIS) transmitters.

Example 14 includes the method of any of Examples 11-13, further comprising: when the second operation mode is selected: receiving a global navigation satellite system (GNSS) signal at the receiver from a global navigation satellite system (GNSS) antenna, the global navigation satellite system (GNSS) signal including data regarding a current location of the receiver; and generating at least one of guidance information and navigation information based on the data regarding the current location of the receiver and the data regarding the current location of the at least one remotely located transmitting device, wherein the second output signal includes the at least one of guidance information and navigation information.

Example 15 includes a radio navigation system processing device onboard an aircraft, the radio navigation system processing device comprising: a first input configured to receive an automatic identification system (AIS) signal from a remotely located automatic identification system (AIS) transmitter, the automatic identification system (AIS) signal identifying a first location of the remotely located automatic identification system (AIS) transmitter; a second input configured to receive a global navigation satellite system (GNSS) signal from at least one global navigation satellite system (GNSS) receiver onboard the aircraft, the global navigation satellite system (GNSS) signal identifying a second location of the aircraft; wherein the radio navigation system processing device is configured to generate a desired flight path between the second location of the aircraft and the first location of the remotely located automatic identification system (AIS) transmitter; wherein the radio navigation system processing device is configured to compute at least one of a lateral deviation and a vertical deviation between an actual flight path of the aircraft and the desired flight path of the aircraft; wherein the radio navigation system processing device is configured to output the at least one of the lateral deviation and the vertical deviation to an external device.

Example 16 includes the radio navigation system processing device of Example 15, wherein the radio navigation system processing device is part of a radio navigation receiver onboard the aircraft; wherein the external device includes a display system and a user interface allowing the pilot to designate the remotely located automatic identification system (AIS) transmitter from a plurality of remotely located automatic identification system (AIS) transmitters.

Example 17 includes the radio navigation system processing device of any of Examples 15-16, wherein the radio navigation receiver is an automatic identification system (AIS) receiver; wherein a switch is positioned between the automatic identification system (AIS) receiver and the external device, the switch configured to toggle between providing a first output of the automatic identification system (AIS) receiver and a second output of another radio navigation receiver onboard the aircraft to the display system; wherein the first output of the automatic identification system (AIS) receiver includes the at least one of the lateral deviation and the vertical deviation; and wherein the at least one of the lateral deviation and the vertical deviation of the first output of the automatic identification system (AIS) receiver has common formatting to at least one of a second lateral deviation and second vertical deviation of the second output of the another radio navigation receiver.

Example 18 includes the radio navigation system processing device of any of Examples 15-17, wherein the radio navigation receiver is an integrated instrument landing system (ILS) and automatic identification system (AIS) receiver configured to operate in both an instrument landing system (ILS) mode and an automatic identification system (AIS) mode; wherein the radio navigation system processing device is configured to output the at least one of the lateral deviation and the vertical deviation to an external device when operating in the automatic identification system (AIS) mode; wherein the radio navigation system processing device is configured to output at least one of a second lateral deviation and a second vertical deviation to an external device when operating in at least one of an instrument landing (ILS) mode and a VHF omni ranging (VOR) mode; and wherein when operating in the instrument landing (ILS) mode, the radio navigation system processing device is configured to compute the at least one of the second lateral deviation and the second vertical deviation based on at least one of an instrument landing system (ILS) signal received from a remotely located instrument landing system (ILS) transmitter and a VHF omni ranging (VOR) signal received from a remotely located VHF omni ranging (VOR) transmitter.

Example 19 includes a radio navigation system processing device comprising: a first input configured to receive a first radio navigation signal formatted as an automatic identification system (AIS) signal identifying a first location of an automatic identification system (AIS) transmitter; a processing unit configured to generate a first emulated output signal from the first radio navigation signal, the first emulated output signal emulating a first output signal format based on at least one of an instrument landing system (ILS) signal and a VHF omni ranging (VOR) signal as an input signal; a first output configured to communicate the first emulated output signal to the external device, wherein the external device is configured to receive output signals having the first output signal format.

Example 20 includes the radio navigation system processing device of Example 19, further comprising: a second input configured to receive a global navigation satellite system (GNSS) signal from at least one global navigation satellite system (GNSS) receiver, the global navigation satellite system (GNSS) signal identifying a second location of the radio navigation system processing device; and wherein the processing unit is further configured to generate the first emulated output signal from both the first radio navigation signal and the global navigation satellite system (GNSS) signal.

Example 21 includes the radio navigation system processing device of any of Examples 19-20, further comprising: a second input configured to receive a second radio navigation signal formatted as at least one of the instrument landing system (ILS) signal and a VHF omni ranging (VOR) signal; wherein the first output is configured to communicate the first emulated output signal to the external device while the radio navigation system processing device is operating in an automatic identification system (AIS) mode; and wherein the first output is configured to communicate a second output signal based on the second radio navigation signal to the external device while the radio navigation signal emulation unit is operating in a second mode.

Example 22 includes the radio navigation system processing device of any of Examples 19-21, further comprising: a second input configured to receive a global navigation satellite system (GNSS) signal from at least one global navigation satellite system (GNSS) receiver, the global navigation satellite system (GNSS) signal identifying a second location of the radio navigation system processing device; a third input configured to receive a second radio navigation signal formatted as at least one of the instrument landing system (ILS) signal and a VHF omni ranging (VOR) signal; wherein the processing unit is further configured to generate the first emulated output signal from both the first radio navigation signal and the global navigation satellite system (GNSS) signal while the radio navigation system processing device is operating in an automatic identification system (AIS) mode; wherein the first output is configured to communicate the first emulated output signal to the external device while the radio navigation system processing device is operating in the automatic identification system (AIS) mode; and wherein the first output is configured to communicate a second output signal based on the second radio navigation signal to the external device while the radio navigation signal emulation unit is operating in a second mode.

What is claimed is:

1. A receiver comprising:
   a radio frequency module configured to receive and down convert multiple types of radio frequency signals received from at least one antenna;
   a communication unit configured to communicate signals with at least one external device;
   a processing unit communicatively coupling the radio frequency module with the communication unit;
   wherein the processing unit is configured to receive an operation mode selection;
   wherein when a first operation mode is selected:
      the processing unit is configured to receive at least a first input signal from the at least one antenna via the radio frequency module, the at least the first input signal including at least one of an instrument landing system (ILS) signal and a VHF (very high frequency) omni ranging (VOR) signal; and
      the processing unit is configured to output a first output signal based on the first input signal to the external device; and
   wherein when a second operational mode is selected:
      the processing unit is configured to receive at least a second input signal from the at least one antenna via the radio frequency module, the at least the second input signal including an automatic identification system (AIS) signal including data regarding a current location of at least one remotely located transmitting device; and
      the processing unit is configured to output a second output signal based on the at least the second input signal to the external device.

2. The receiver of claim 1, wherein the at least one remotely located transmitting device includes a plurality of remotely located automatic identification system (AIS) transmitters broadcasting position data from a plurality of locations, wherein the at least the second input signal includes the position data from the plurality of remotely located automatic identification system (AIS) transmitters.

3. The receiver of claim 2, further comprising:
   wherein the processing unit is further configured to track positions of the plurality of remotely located automatic identification system (AIS) transmitters; and
   wherein the processing unit is further configured to generate the second output signal based on the positions of the plurality of remotely located automatic identification system (AIS) transmitters.

4. The receiver of claim 1, wherein the at least the second input signal includes automatic identification system (AIS) signals broadcast from a plurality of remotely located automatic identification system (AIS) transmitters; and
   wherein the external device includes an interface that allows selection of a specific remotely located automatic identification system (AIS) transmitter of the plurality of remotely located automatic identification system (AIS) transmitters; and
   when the second operation mode is selected:
      wherein the processing unit is further configured to generate the second output signal by generating at least one guidance signal from a first current location of the receiver to a second current location of the specific remotely located automatic identification system (AIS) transmitter.

5. The receiver of claim 4, further comprising:
   when the second operation mode is selected:
      wherein the processing unit is configured to receive a global navigation satellite system (GNSS) signal from a global navigation satellite system (GNSS) antenna; and
      wherein the first current location of the receiver is based on the global navigation satellite (GNSS) signal.

6. The receiver of claim 1, further comprising:
   when the second operation mode is selected:
      wherein the processing unit is configured to receive a global navigation satellite system (GNSS) signal from a global navigation satellite system (GNSS) antenna, the global navigation satellite system (GNSS) signal including data regarding a current location of the receiver; and
      wherein the processing unit is configured to generate at least one of guidance information and navigation information based on the data regarding the current location of the receiver and the data regarding the current location of a desired destination remotely located transmitting device of the at least one remotely located transmitting device, wherein the second output signal includes the at least one of guidance information and navigation information.

7. The receiver of claim 1, wherein the external device is at least one of a display system and a flight control system.

8. The receiver of claim 7, further comprising:
   when the second operation mode is selected:
      wherein the receiver is configured to generate the second output signal by emulating the format of the first output signal, such that both the first output signal and the second output signal are formatted with common formatting expected by the display system.

9. The receiver of claim 8, further comprising:
   wherein the first output signal includes information relating to a bearing from the receiver to a second desired destination based on the at least one of an instrument landing system (ILS) signal and a VHF omni ranging (VOR) signal;
   wherein the second output signal includes information relating to a bearing from the receiver to the desired destination.

10. The receiver of claim 1, further comprising:
    wherein the external device is a display system; and
    when the second operation mode is selected:

wherein the processing unit is configured to receive a global navigation satellite system (GNSS) signal from a global navigation satellite system (GNSS) antenna;

wherein the receiver is configured to generate the second output signal by emulating the format of the first output signal, such that both the first output signal and the second output signal are formatted with common formatting expected by the display system;

wherein the first output signal includes information relating to a bearing from the receiver to a desired destination based on the at least one of an instrument landing system (ILS) signal and a VHF omni ranging (VOR) signal; and wherein the second output signal includes information relating to at least one of a selected course deviation and a bearing from the receiver to the desired destination based on both the at least the second input signal and the global navigation satellite system (GNSS) signal.

11. A method for receiving various types of signals using a single receiver, the method comprising:
receiving an operation mode selection;
when a first operation mode is selected:
receiving at least a first input signal at a receiver from at least one antenna, the first input signal including at least one of an instrument landing system (ILS) signal and a VHF (very high frequency) omni ranging (VOR) signal; and
outputting a first output signal based on the first input signal from the receiver to an external device; and
when a second operation mode is selected:
receiving at least a second input signal at the receiver from the at least one antenna, the at least the second input signal including at least one automatic identification system (AIS) signal including data regarding a current location of at least one remotely located transmitting device; and
outputting a second output signal based on the at least the second input signal from the receiver to the external device.

12. The method of claim 11, wherein the at least one remotely located transmitting device includes a plurality of automatic identification system (AIS) transmitters broadcasting data from a plurality of locations, wherein the at least the second input signal includes the position data from the plurality of remotely located automatic identification system (AIS) transmitters.

13. The method of claim 12, further comprising:
tracking positions of the plurality of remotely located automatic identification system (AIS) transmitters; and
generating the second output signal based on the positions of the plurality of remotely located automatic identification system (AIS) transmitters.

14. The method of claim 11, further comprising:
when the second operation mode is selected:
receiving a global navigation satellite system (GNSS) signal at the receiver from a global navigation satellite system (GNSS) antenna, the global navigation satellite system (GNSS) signal including data regarding a current location of the receiver; and
generating at least one of guidance information and navigation information based on the data regarding the current location of the receiver and the data regarding the current location of the at least one remotely located transmitting device, wherein the second output signal includes the at least one of guidance information and navigation information.

15. A radio navigation system processing device onboard an aircraft, the radio navigation system processing device comprising:
a first input configured to receive an automatic identification system (AIS) signal from a remotely located automatic identification system (AIS) transmitter, the automatic identification system (AIS) signal identifying a first location of the remotely located automatic identification system (AIS) transmitter;
a second input configured to receive a global navigation satellite system (GNSS) signal from at least one global navigation satellite system (GNSS) receiver onboard the aircraft, the global navigation satellite system (GNSS) signal identifying a second location of the aircraft;
wherein the radio navigation system processing device is configured to generate a desired flight path between the second location of the aircraft and the first location of the remotely located automatic identification system (AIS) transmitter;
wherein the radio navigation system processing device is configured to compute at least one of a lateral deviation and a vertical deviation between an actual flight path of the aircraft and the desired flight path of the aircraft;
wherein the radio navigation system processing device is configured to output the at least one of the lateral deviation and the vertical deviation to an external device.

16. The radio navigation system processing device of claim 15, wherein the radio navigation system processing device is part of a radio navigation receiver onboard the aircraft;
wherein the external device includes a display system and a user interface allowing the pilot to designate the remotely located automatic identification system (AIS) transmitter from a plurality of remotely located automatic identification system (AIS) transmitters.

17. The radio navigation system processing device of claim 15, wherein the radio navigation receiver is an automatic identification system (AIS) receiver;
wherein a switch is positioned between the automatic identification system (AIS) receiver and the external device, the switch configured to toggle between providing a first output of the automatic identification system (AIS) receiver and a second output of another radio navigation receiver onboard the aircraft to the display system;
wherein the first output of the automatic identification system (AIS) receiver includes the at least one of the lateral deviation and the vertical deviation; and
wherein the at least one of the lateral deviation and the vertical deviation of the first output of the automatic identification system (AIS) receiver has common formatting to at least one of a second lateral deviation and second vertical deviation of the second output of the another radio navigation receiver.

18. The radio navigation system processing device of claim 15, wherein the radio navigation receiver is an integrated instrument landing system (ILS) and automatic identification system (AIS) receiver configured to operate in both an instrument landing system (ILS) mode and an automatic identification system (AIS) mode;
wherein the radio navigation system processing device is configured to output the at least one of the lateral deviation and the vertical deviation to an external device when operating in the automatic identification system (AIS) mode;

wherein the radio navigation system processing device is configured to output at least one of a second lateral deviation and a second vertical deviation to an external device when operating in at least one of an instrument landing (ILS) mode and a VHF (very high frequency) omni ranging (VOR) mode; and wherein when operating in the instrument landing (ILS) mode, the radio navigation system processing device is configured to compute the at least one of the second lateral deviation and the second vertical deviation based on at least one of an instrument landing system (ILS) signal received from a remotely located instrument landing system (ILS) transmitter and a VHF omni ranging (VOR) signal received from a remotely located VHF omni ranging (VOR) transmitter.

19. A radio navigation system processing device comprising:
a first input configured to receive a first radio navigation signal formatted as an automatic identification system (AIS) signal identifying a first location of an automatic identification system (AIS) transmitter;
a processing unit configured to generate a first emulated output signal from the first radio navigation signal, the first emulated output signal emulating a first output signal format based on at least one of an instrument landing system (ILS) signal and a VHF (very high frequency) omni ranging (VOR) signal as an input signal;
a first output configured to communicate the first emulated output signal to the external device, wherein the external device is configured to receive output signals having the first output signal format.

20. The radio navigation system processing device of claim 19, further comprising:
a second input configured to receive a global navigation satellite system (GNSS) signal from at least one global navigation satellite system (GNSS) receiver, the global navigation satellite system (GNSS) signal identifying a second location of the radio navigation system processing device; and
wherein the processing unit is further configured to generate the first emulated output signal from both the first radio navigation signal and the global navigation satellite system (GNSS) signal.

21. The radio navigation system processing device of claim 19, further comprising:
a second input configured to receive a second radio navigation signal formatted as at least one of the instrument landing system (ILS) signal and a VHF omni ranging (VOR) signal;
wherein the first output is configured to communicate the first emulated output signal to the external device while the radio navigation system processing device is operating in an automatic identification system (AIS) mode; and
wherein the first output is configured to communicate a second output signal based on the second radio navigation signal to the external device while the radio navigation signal emulation unit is operating in a second mode.

22. The radio navigation system processing device of claim 19, further comprising:
a second input configured to receive a global navigation satellite system (GNSS) signal from at least one global navigation satellite system (GNSS) receiver, the global navigation satellite system (GNSS) signal identifying a second location of the radio navigation system processing device;
a third input configured to receive a second radio navigation signal formatted as at least one of the instrument landing system (ILS) signal and a VHF omni ranging (VOR) signal;
wherein the processing unit is further configured to generate the first emulated output signal from both the first radio navigation signal and the global navigation satellite system (GNSS) signal while the radio navigation system processing device is operating in an automatic identification system (AIS) mode;
wherein the first output is configured to communicate the first emulated output signal to the external device while the radio navigation system processing device is operating in the automatic identification system (AIS) mode; and
wherein the first output is configured to communicate a second output signal based on the second radio navigation signal to the external device while the radio navigation signal emulation unit is operating in a second mode.

* * * * *